Sept. 20, 1966 F. W. COBURN 3,273,858
TRAILER TONGUE ELEVATOR
Filed July 16, 1964 2 Sheets-Sheet 1
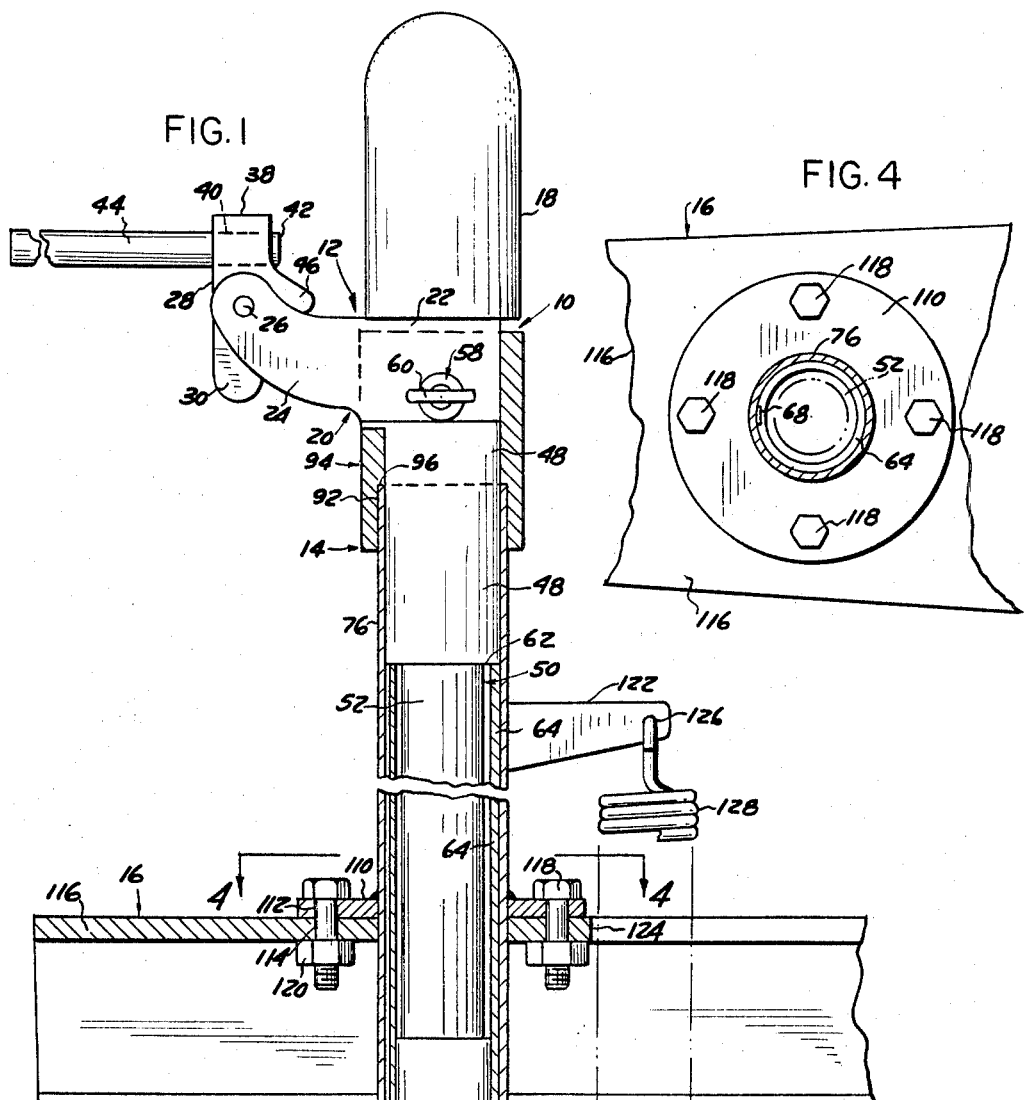
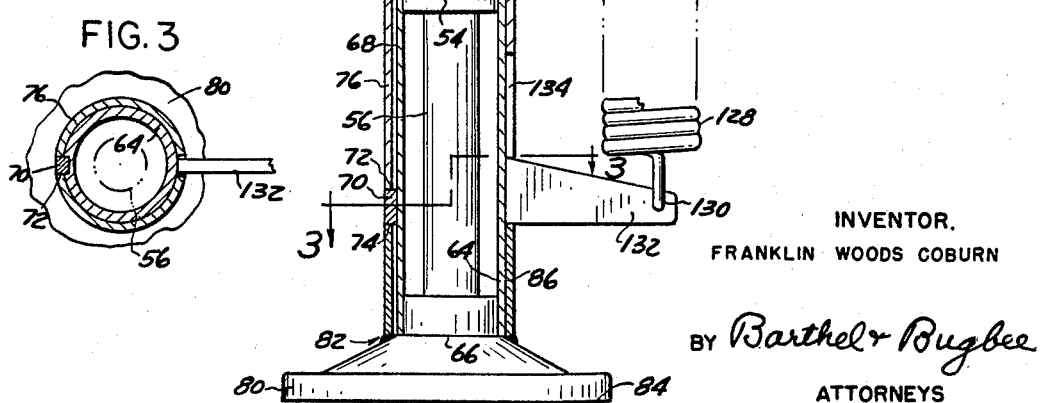
INVENTOR.
FRANKLIN WOODS COBURN
BY Barthel & Bugbee
ATTORNEYS

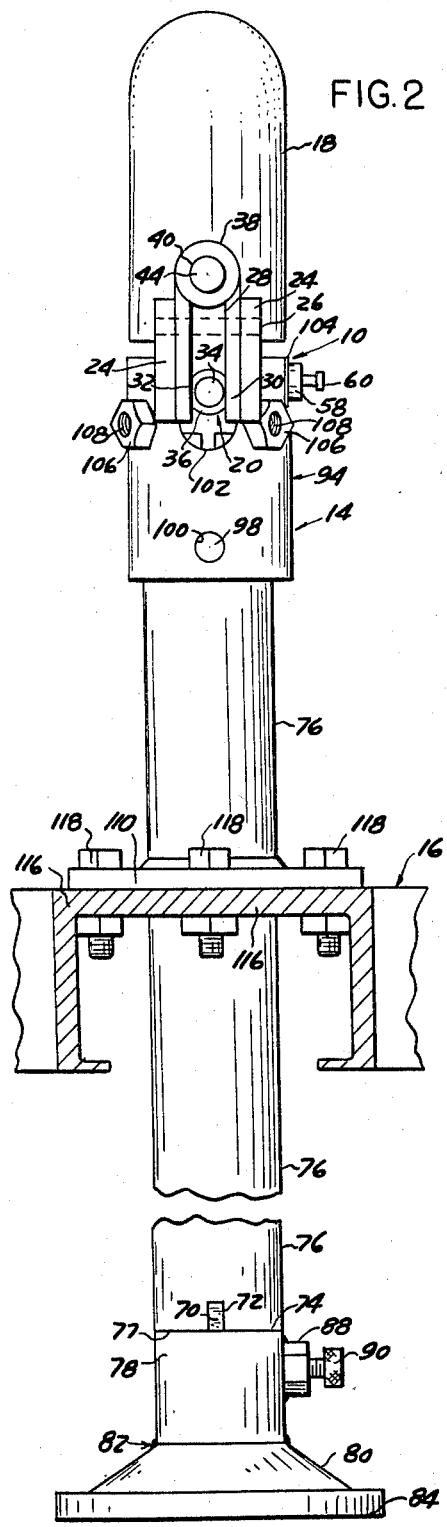

United States Patent Office 3,273,858
Patented Sept. 20, 1966

3,273,858
TRAILER TONGUE ELEVATOR
Franklin Woods Coburn, 81 S. Edgewood Drive,
Grosse Pointe Shores, Mich.
Filed July 16, 1964, Ser. No. 383,020
4 Claims. (Cl. 254—86)

This invention relates to trailers and, in particular, to elevators for the tongues or drawbars of trailers.

Hitherto, it has been necessary for owners of house trailers or the like to lift the tongue or tow bar of the trailer in order to couple it with the towing vehicle and attach the sway bars. Previously, this lifting of the tongue or tow bar has been accomplished by a screw-operated jack which requires manual rotation of a vertical screw in order to accomplish the lifting. This manual rotation of the jack screw required the operator to assume an awkward position in order to rotate the crank of the screw in a horizontal orbit, and the heavy weight of the trailer required the exertion of a considerable physical effort. These disadvantages seriously handicap the owner or operator of a trailer with such a prior lifting device, particularly where the operator was not physically capable of doing this or where it jeopardized his health, such as in the case of heart disease, arthritis and the like. The present invention provides a hydraulically-operated elevator for the trailer tongue which not only requires very little physical effort for its operation but also enables this physical effort to be applied in a vertical direction where it is most easily performed.

Accordingly, one object of this invention is to provide a hydraulically-operated trailer tongue elevator wherein a pump is provided in the upper portion thereof whereby the manual actuation of a hydraulic pump handle in a vertical direction causes the trailer tongue to be lifted easily and efficiently with the exertion of very little physical effort.

Another object is to provide a trailer tongue elevator of the foregoing character which is adaptable to different makes and models of trailers and which is quickly and easily attached thereto with a minimum of work and requiring only ordinary mechanical skill.

Another object is to provide a trailer tongue elevator of the foregoing character which adapts a commercially available pump and plunger unit to the elevation of a trailer tongue by simple and efficient adaptation and attachment means, thereby reducing the cost of the elevator and consequently enabling it to be sold at a low price to the purchaser.

Other objects and advantages of the invention will become apparent during the course of the following description of the accompanying drawings, wherein:

FIGURE 1 is a side elevation, partly in vertical section, of a trailer tongue elevator in its lowered position attached to a trailer tongue, according to one form of the invention, with the trailer coupling omitted;

FIGURE 2 is a front elevation of the trailer elevator and its mounting on the trailer tongue;

FIGURE 3 is a cross-section, partly in top plan view, taken along the broken line 3—3 in FIGURE 1, with the trailer coupling omitted;

FIGURE 4 is a cross-section taken along the line 4—4 in FIGURE 1; and

FIGURE 5 is a fragmentary vertical section similar to the lower portion of FIGURE 1 but showing the trailer tongue elevator in its partially raised position.

Referring to the drawings in detail, FIGURES 1 and 2 show a trailer tongue elevator, generally designated 10, according to one form of the invention. This consists generally of a hydraulic pump and reciprocatory lifting motor unit or hydraulic jack 12 and a mounting structure or hydraulic jack holder 14 by which the pump-and-motor unit 12 is attached to the trailer tongue 16, in which the conventional coupling by which the trailer is connected to the towing vehicle has been omitted in order to simplify the disclosure.

The hydraulic pump-and-motor unit 12 is conventional and available upon the open market. Its details are familiar to those skilled in the hydraulic jack art, they are beyond the scope of the present invention, and a general description thereof is deemed sufficient for the purpose of the present invention. Accordingly, the pump-and-motor lifting unit or jack 12 includes a dome-shaped hydraulic fluid reservoir 18 to the lower end of which is connected a reciprocatory manual hydraulic pump unit 20 contained within a casing 22 having parallel ears 24 projecting laterally therefrom and bored transversely to receive a pivot pin 26 upon which a pump actuating lever 28 is pivotally mounted. The pump actuating lever 28 has parallel lower arms 30 (FIGURE 2) which are coupled through a pin-and-slot connection 32 (FIGURE 2) to the horizontal plunger 34 of the cylinder 36 of the reciprocatory manual hydraulic pump 20. The pump-actuating lever 28 also has an upper arm 38 containing a bore 40 which removably receives the reduced diameter inner end 42 of a pump handle 44. The pump actuating lever 28 further is provided with a stop arm 46 intermediate the upper and lower arms 38 and 30 and engaging the ears 24 to limit the upward stroke of the handle 44 (FIGURE 1).

Connected to and depending from the pump casing 22 is the cylindrical upper head 48 of a reciprocatory hydraulic motor, generally designated 50, and including a hollow motor cylinder 52 secured at its upper end to the upper head 48 and at its lower end to a cylindrical lower head 54 bored for the passage of a motive plunger or piston 56, the piston head (not shown) of which is vertically reciprocable within the motor cylinder 52. It will be understood, of course, that the lower head 54 contains the usual packing or gland to prevent leakage of hydraulic fluid and that the upper head contains passageways for the hydraulic fluid proceeding to and from the pump 36 and fluid reservoir 18. The pump casing 22 also contains a bleed valve or bypass valve 58 (FIGURE 1) having a rotary handle 60 by which hydraulic fluid may be released from the hydraulic motor cylinder 50 into the reservoir 18 in order to permit the lowering of the trailer tongue 16 as described below in connection with the operation of the invention.

The upper motor head 48 at its junction with the cylinder 52 thereof has an annular shoulder 62 (FIGURE 1) which rests upon the upper end of an inner adapter cylinder or tubular member 64, the lower end of which is closed by a plug or disc 66 welded or otherwise secured thereto. The lower end of the hydraulic motor plunger 56 is also secured to the plug or disc 66. The inner adapter tube 64 is provided with an elongated external groove or keyway 68 (FIGURES 1 and 4) extending substantially its entire length and slidably engaged by a key 70 welded or otherwise secured in a notch or slot 72 (FIGURE 2) in the lower end 74 of an outer adapter cylinder or tubular member 76. The lower end 74 of the outer adapter cylinder 76 rests upon the upper end 77 of an upstanding collar 78 which is welded or otherwise secured to the base 80 of a ground-engaging rest consisting of a shoe or foot 82. The latter has a bottom surface 84 adapted to rest upon the ground, and the collar 78 cooperates with the base 80 to provide a cylindrical socket 86 into which the lower end of the inner adapter tube 64 snugly fits. Welded or otherwise secured to the outside of the collar 78 (FIGURE 2) is a threaded nut 88, the collar 78 being bored and threaded in continuation of the threaded bore within the nut 88. A clamping screw or bolt 90 is threaded through the nut 88 and collar 78 into clamping engagement with the lower end of the inner adapter tube 64 to prevent accidental withdrawal therefrom.

The upper end of the outer adapter tube 76 is seated in an annular socket or bore 92 (FIGURE 1) within an adapter sleeve 94 against the annular internal shoulder 96 thereof, and the two secured to one another by a pair of diametrically-opposite puddle welds 98 (FIGURE 2) made in a pair of diametrically-opposite holes 100 through the lower portion of the adapter sleeve 94 (only one of the welds 98 and holes 100 being shown in the drawings). The adapter sleeve 94 is provided with a pair of U-shaped notches 102 and 104 extending downwardly from the upper end thereof. The notch 102 accommodates the ears 24 of the pump casing 22, whereas the notch 104 receives the bleed or bypass valve 58 in such a manner that the entire pump-and-motor unit 12 can be lowered into the upper sleeve or collar 94 and secured in that position. Such securing is accomplished by four nuts 106 (two only being shown in FIGURE 2) welded or otherwise secured at circumferentially-spaced locations around the upper collar or sleeve 94, the latter being drilled and threaded in continuation of the threaded bores of the nuts 106. Bolts or screws 108, such as the well-known headless Allen screws, are preferably used to secure the upper head 48 of the pump-and-motor unit 12 firmly within the upper sleeve or collar 94 by being threaded through the nuts 106 into clamping engagement with the upper head 48 at circumferentially-spaced locations thereon.

Welded or otherwise secured to the outer adapter cylinder 76 intermediate its upper and lower ends is an annular mounting or attachment member or flange 110 (FIGURE 1) which is drilled at circumferentially-spaced locations 112 in line with similar holes 114 in the upper wall 116 of the trailer tongue 16 to receive mounting bolts 118, the nuts 120 of which securely clamp the flange 110 to the trailer tongue 16. Also welded or otherwise secured to the outer adapter cylinder 76 is an upper spring anchorage arm 122 which is of sufficient length to project beyond the outer or forward end 124 of the trailer tongue 16 and which is provided with a hole 126 for the reception of the upper end of a tension spring 128. The lower end of the spring 128 is hooked into a similar hole 130 in the outer end of a similar lower spring anchorage arm 132, the rearward end of which, however, is welded or otherwise secured to the inner adapter tube 64 in spaced parallel relationship to the upper arm 122. In order to provide clearance for the lower arm 132, the lower end portion to the outer adapter tube 76 is provided with an elongated slot 134 extending upward from the lower end 74 of the outer adapter cylinder 76.

In the operation of the invention, let it be assumed that the trailer tongue elevator 10 has been mounted in the manner shown in FIGURES 1 and 2 and is in its retracted position as shown therein. To elevate the trailer tongue 16, the operator grasps the handle 44 and swings it upward and downward with a pumping motion, causing each stroke of the pump-actuating lever 28 to effect a corresponding stroke of the pump plunger 34 within the pump cylinder 36 (FIGURE 2). As a result, hydraulic fluid is pumped under pressure from the reservoir 18 into the upper end of the motor cylinder 52 against the head of the piston 56 therein. Since the piston 56 cannot move downward, since it is already resting upon the foot or shoe 82, the motor cylinder 52 rises, carrying with it the adapter sleeve a collar 94 and the outer adapter cylinder 76, through the connection made by the clamping screws 108 (FIGURE 2). As a result, the mounting flange 110 moves upward with the outer adapter cylinder 76 (FIGURE 5) consequently lifting the trailer tongue 16 through its connection therewith by means of the bolts 118. As the outer adapter cylinder 76 moves upward, the key 70 carried by it in its slot 72 likewise moves upward in sliding engagement with the keyway 68, thereby preventing relative rotation between the outer and inner adapter cylinders 76 and 64 respectively. Little physical effort is required on the part of the operator in operating the pump handle 44, and he does so from a most favorable position insuring the most efficient body posture.

When the trailer tongue 16 and the trailer attached to it have been elevated to the desired amount, the operator stops pumping the handle 44, whereupon the hydraulic fluid trapped in the upper end of the motor cylinder 52 prevents descent thereof and holds the parts in their attained positions. As a result, the operator can perform the coupling operations as well as the attachment of the sway bars.

To lower the trailer tongue 16 after these operations have been completed, the operator turns the valve handle 60 and thus operates the bypass valve 58 to release hydraulic fluid from the upper end of the motor cylinder 52 into the reservoir 18. As this occurs, the cylinder 52 descends slowly until its lower end 74 again rests upon the upper end 77 of the collar 78 on the shoe or foot 82. During the descent, the retraction of the motor cylinder 52 and outer adapter cylinder 76 is assisted by the pull of the tension spring 128 upon the upper and lower arms 122 and 132 which during the ascent of these cylinders 52 and 76 elongated the tension spring 178 and stored potential energy therein.

What I claim is:
1. A trailer tongue elevator comprising
    a hydraulic lifting jack including a manually-operated hydraulic pump, a hydraulic fluid reservoir, and a hydarulic reciprocatory motor hydraulically connected to said pump and reservoir,
        said motor having a lifting cylinder and a supporting plunger movably mounted in said cylinder for relative reciprocation therebetween and extending downwardly from said cylinder,
    a ground-engaging structure mounted on the lower portion of said plunger,
    and a trailer tongue adapter structure including a jack holder connected to said jack and also including attachment means for securing said jack holder to a trailer tongue,
    said jack holder including an outer tubular member surrounding said cylinder and also including means for securing said cylinder to said outer tubular member, said securing means including a sleeve connected to the upper portion of said outer tubular member and also connected to the upper portion of said cylinder, said sleeve having an opening therein and said pump being disposed above said cylinder and extending outwardly therefrom through said opening.

2. A trailer tongue elevator, according to claim 1, wherein said securing means also includes fasteners extending through said sleeve and effecting clamping engagement thereof with said upper portion of said cylinder.

3. A trailer tongue elevator, according to claim 1, wherein said trailer tongue attachment means including a mounting plate member secured to said outer tubular member in laterally-projecting relationship and having fastener-receiving portions thereon adapted to receive fasteners attachably securing said mounting plate member to the trailer tongue.

4. A trailer tongue elevator, according to claim 1, wherein said ground-engaging structure includes a base member connected to said plunger and an upstanding collar member connected at its lower end to said base member and at its upper end engaging the lower end of said outer tubular member.

References Cited by the Examiner
UNITED STATES PATENTS

| | | |
|---|---|---|
| 2,142,216 | 1/1939 | Seyferth _____ 254—86 X |
| 2,143,182 | 1/1939 | Barr _____ 254—86 X |
| 2,369,545 | 2/1945 | Dunn. |
| 2,424,741 | 7/1947 | Chambers _____ 254—86 |
| 2,962,298 | 11/1960 | Hefling _____ 254—86 X |

WILLIAM FELDMAN, Primary Examiner.

OTHELL M. SIMPSON, Examiner.